United States Patent
Hessling Von Heimendahl et al.

(10) Patent No.: US 9,850,002 B2
(45) Date of Patent: Dec. 26, 2017

(54) STATUS INDICATING LIGHT UNIT AND AIRCRAFT COMPRISING THE SAME

(71) Applicant: Goodrich Lighting Systems GmbH, Lippstadt (DE)

(72) Inventors: Andre Hessling Von Heimendahl, Koblenz (DE); Steffen Roebke, Paderborn (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 14/664,062

(22) Filed: Mar. 20, 2015

(65) Prior Publication Data

US 2015/0274318 A1 Oct. 1, 2015

(30) Foreign Application Priority Data

Mar. 28, 2014 (EP) ..................... 14162214

(51) Int. Cl.
*B64D 47/02* (2006.01)
*H05B 33/08* (2006.01)

(52) U.S. Cl.
CPC ......... *B64D 47/02* (2013.01); *H05B 33/0809* (2013.01); *H05B 33/0851* (2013.01); *H05B 33/0812* (2013.01); *H05B 33/0815* (2013.01); *H05B 33/0893* (2013.01)

(58) Field of Classification Search
None
See application file for complete search history.

(56) References Cited

U.S. PATENT DOCUMENTS

| 5,259,380 A | 11/1993 | Mendes |
| 6,879,263 B2 * | 4/2005 | Pederson ............. B60Q 1/2611 340/815.45 |

(Continued)

FOREIGN PATENT DOCUMENTS

| EP | 2663162 A1 | 11/2013 |
| FR | 2957469 A1 | 9/2011 |

(Continued)

OTHER PUBLICATIONS

European Search Report for Application No. 14162214.2-1802, dated Nov. 9, 2014, 10 Pages.

*Primary Examiner* — Alexander H Taningco
*Assistant Examiner* — Nelson Correa
(74) *Attorney, Agent, or Firm* — Cantor Colburn LLP

(57) ABSTRACT

A status indicating light unit includes a power input terminal, an illumination circuit, comprising at least one LED, a continuous connection circuit, coupled to the illumination circuit and configured to effect a continuous power transfer from a power input terminal to the illumination circuit, a pulsed power reception circuit, coupled to the illumination circuit and configured to draw power from the power input terminal in a pulsed manner and to continuously emit power to the illumination circuit, and a mode selection switch adapted to couple the continuous connection circuit to the power input terminal in a continuous power draw mode, resulting in a continuous power draw pattern of the status indicating light unit, and adapted to couple the pulsed power reception circuit to the power input terminal in a pulsed power draw mode.

14 Claims, 1 Drawing Sheet

(56) References Cited

U.S. PATENT DOCUMENTS

| | | | | |
|---|---|---|---|---|
| 7,356,336 B2* | 4/2008 | Perez | ............... | G07C 5/008 455/345 |
| 7,369,062 B2* | 5/2008 | Stokes | ............... | G05B 15/02 340/945 |
| 7,511,437 B2* | 3/2009 | Lys | ............... | H02M 1/4225 315/224 |
| 7,710,253 B1* | 5/2010 | Fredricks | ............... | B60Q 11/005 315/76 |
| 8,072,163 B2* | 12/2011 | Roberts | ............... | H05B 33/0893 315/169.1 |
| 8,182,123 B2* | 5/2012 | Vogel | ............... | B60Q 3/0256 362/471 |
| 8,207,635 B2* | 6/2012 | Covaro | ............... | H04B 3/542 307/112 |
| 8,274,232 B2* | 9/2012 | Nerone | ............... | H04B 3/544 315/209 R |
| 8,344,659 B2* | 1/2013 | Shimomura | ............... | H05B 37/0245 315/169.3 |
| 8,890,487 B2* | 11/2014 | Jung | ............... | H02J 9/005 315/294 |
| 9,084,333 B2* | 7/2015 | Chandran | ............... | H05B 37/0263 |
| 9,342,058 B2* | 5/2016 | Koski | ............... | H05B 33/0851 |
| 9,374,855 B2* | 6/2016 | Siessegger | ............... | H05B 33/0803 |
| 9,655,186 B2* | 5/2017 | Hessling Von Heimendahl | ............... | H05B 33/0842 |
| 2007/0188114 A1 | 8/2007 | Lys | | |
| 2007/0200725 A1 | 8/2007 | Fredericks | | |
| 2010/0033980 A1 | 2/2010 | Vogel | | |
| 2011/0089855 A1 | 4/2011 | Roberts | | |
| 2015/0091438 A1* | 4/2015 | Hessling Von Heimendahl | ............... | B60Q 3/0256 315/77 |
| 2015/0123464 A1* | 5/2015 | Hess | ............... | B64D 11/06 307/9.1 |

FOREIGN PATENT DOCUMENTS

| | | |
|---|---|---|
| JP | 2014002904 A | 1/2014 |
| WO | 2007022409 A2 | 2/2007 |

* cited by examiner

STATUS INDICATING LIGHT UNIT AND AIRCRAFT COMPRISING THE SAME

FOREIGN PRIORITY

This application claims priority to European Patent Application No. 14 162 214.2 filed Mar. 28, 2014, the entire contents of which is incorporated herein by reference.

TECHNICAL FIELD

The invention relates to lighting systems, such as used in passenger transport vehicles, such as aircraft, road vehicles, ships or rail cars. In particular, the invention relates to light units that indicate their operational status to their power supply.

BACKGROUND

LED light units are becoming more and more common in many fields of technology. In the exemplary field of passenger transport vehicles, such as aircraft, road vehicles, ships or rail cars, more and more interior and exterior lights are based on LED technology. Such LED light units are commonly designed for a particular power consumption and, accordingly, for a particular power reception from the power supply. However, this power reception may not always be stationary over time. In particular, if one of the LEDs breaks, a situation may arise where the LED light unit becomes defective and does not collect any power from the power supply. It is also possible that the power consumption of the LED light unit increases over time in order to provide more current to the LEDs in order to keep the output light intensity constant despite ageing of the LEDs. These changes in the functioning of the LED light unit are an important piece of information for the overall passenger transport vehicle. In particular, this information would be useful to have for a maintenance computer of the passenger transport vehicle, such as an aircraft maintenance computer or car maintenance computer. In prior art approaches, no satisfactory system for conveying said information has been proposed.

Accordingly, it would be beneficial to provide a light unit based on LED technology that has improved means for conveying information about its operational status to the remainder of the passenger transport vehicle, in particular to the remainder of the power supply system. Further, it would be beneficial to provide a passenger transport vehicle, in particular an aircraft, with such improved light unit based on LED technology. Further, it would be beneficial to provide a method of replacing existing light units with such improved light units.

SUMMARY

Exemplary embodiments of the invention include a status indicating light unit, comprising a power input terminal, coupleable to an external power supply, an illumination circuit, comprising at least one LED, a continuous connection circuit, coupled to the illumination circuit and configured to effect a continuous power transfer from the power input terminal to the illumination circuit, a pulsed power reception circuit, coupled to the illumination circuit and configured to draw power from the power input terminal in a pulsed manner and to continuously emit power to the illumination circuit, and a mode selection switch adapted to couple the continuous connection circuit to the power input terminal in a continuous power draw mode, resulting in a continuous power draw pattern of the status indicating light unit, and adapted to couple the pulsed power reception circuit to the power input terminal in a pulsed power draw mode, resulting in a pulsed power draw pattern of the status indicating light unit. The respective power draw patterns of the status indicating light unit indicate an operational status of the status indicating light unit to the external power supply.

The inventive status indicating light unit has two modes of operation. These two modes of operation include the continuous power draw mode, in which the light unit draws power from the power supply at a constant power value, and a pulsed power draw mode in which the light unit draws power from the power supply according to a varying course over time. The external power supply, i.e. the power supply external to the status indicating light unit, recognizes the power draw pattern. In particular, it recognizes if the power from the power supply to the status indicating light unit is transferred with a constant value or if the power from the power supply to the status indicating light unit is transferred in a discontinuous manner. The power supply may recognize the pulsed power draw pattern by observing if the drawn power falls below and/or exceeds preset power threshold values.

In this way, the power draw pattern contains at least one bit of information, which signals a piece of information about the operational status of the light unit to the power supply. While the continuous power draw mode signals normal operation to the power supply, the pulsed power draw mode signals a need for replacement and/or maintenance and/or inspection to the power supply. As the continuous power draw mode and the pulsed power draw mode result in conceptionally and fundamentally different power draw patterns, the power supply may easily and reliably detect the operational status of the light unit. In this way, the light unit is an intelligent light unit that indicates, out of its own motion, its operational status to the power supply. In other words, it is an autonomous status indicating light unit. For the conveying of information on the operational status, no additional wiring or dedicated control lines are necessary. The information on the operational status is embedded into the power draw. In this way, the modulation of the power draw is an embodiment of a signalling protocol between the power supply and the status indicating light unit. The information on the operational status may be conveyed without interrupting LED operation.

The coupling of the continuous connection circuit to the power input terminal results in the continuous power draw mode with a continuous power draw pattern, i.e. in a mode of continuous power transfer from the external power supply to the status indicating light unit. In contrast thereto, the coupling of the pulsed power reception circuit to the power input terminal results in the pulsed power draw mode with a pulsed power draw pattern, i.e. in a mode of discontinuous power transfer from the external power supply to the status indicating light unit.

The term pulsed power draw refers to a discontinuous power transfer, wherein the value of power transfer at least temporarily deviates from the nominal power transfer in the continuous power draw mode. In particular, the pulsed power draw pattern may follow a waveform over time. The term waveform refers to changing values of power transfer over time, with the general pattern of the power transfer being repetitive. In very general words, a pulsed power draw refers to a power draw with intervals of larger power transfer and intervals of smaller power transfer. The term pulsed power draw pattern does not imply any particular pattern over time. The pulsed power draw pattern may be a sequence of rectangular pulses or a sawtooth pattern or a sinusoidal pattern or any other suitable varying pattern. The term pulsed power reception circuit refers to a circuit via which such a pulsed power draw pattern is achieved. The term pulsed power draw mode refers to an operation of the status indicating light unit where such a pulsed power draw pattern is present.

The continuous connection circuit may be a simple connection between the mode selection switch and the illumination circuit, such as a simple wire connection. However, it is also possible that further circuit elements may be interposed between the mode selection switch and the illumination circuit in the continuous connection circuit.

According to a further embodiment, the operational status comprises information about at least one of a level of an output light intensity of the illumination circuit, an operating duration of the status indicating light unit, and an operational error of the status indicating light unit. In other words, the conveyed operational status may contain or depend on one or more pieces of information with respect to various momentary and/or historical properties of the status indicating light unit. These properties may include a momentary level of the output light intensity of the illumination circuit, an operating duration of the status indicating light unit to date, and a momentary operational error of the status indicating light unit. Other indications are possible as well. The information about the operational error of the status indicating light unit may indicate the overall malfunctioning of the status indicating light unit, which may be derived from performance parameters, and/or it may indicate the malfunctioning of a circuit component. In particular, the information about the operational error of the status indicating light unit may be information about an operational error of the pulsed power reception circuit. Further in particular, the information about an operational error of the pulsed power reception circuit may be an information about a defect of a chargeable element of the pulsed power reception circuit, such as about a defect of a capacitor of the pulsed power reception circuit, which will be explained below.

It is possible that different signals may be conveyed to the external power supply for two or more of the level of the output light intensity of the illumination circuit, the operating duration of the status indicating light unit, and the operational error of the status indicating light unit via various power draw patterns. It is also possible that the status indicating light unit only has two power draw modes, namely above described continuous power draw mode and exactly one pulsed power draw mode. In this case, the selection between the two modes may be indicative of exactly one momentary property of the status indicating light unit. However, it is also possible that the selected power draw mode is indicative of two or more of these properties, with a logic circuit combining the available information and transforming it into a single bit of information.

In a particular embodiment, the operational status may contain the information that the level of the output light intensity of the illumination circuit is below a preset intensity threshold. According to a further particular embodiment, the operational status may contain the information that the operating duration of the status indicating light unit exceeded a preset duration threshold. According to a further particular embodiment, the operational status may contain the information that an operational error of the status indicating light unit, in particular an operational error of the chargeable element of the pulsed power reception circuit, is present. According to a further particular embodiment, the operational status may contain the information that any one of these conditions is present.

In this way, the status indicating light unit may report one or more undesired states to the power supply. In particular, it may be capable to detect one or more of various different conditions that are indicators of the status indicating light unit not working properly or approaching its end of lifetime. A near end of life condition may be signalled to the power supply, before the status indicating light unit actually stops working.

According to a further embodiment, the status indicating light unit may further comprise a switch controller, which switch controller is configured to control the mode selection switch in dependence of at least one of a level of an output light intensity of the illumination circuit, an operating duration of the status indicating light unit, and an operational error of the status indicating light unit. The switch controller may have suitable logic that either depends on one of these pieces of information or that combines two or more of those pieces of information in a suitable manner.

According to a further embodiment, the status indicating light unit further comprises an output light intensity detector, adapted to detect a level of an output light intensity of the illumination circuit and to control the mode selection switch to couple the pulsed power reception circuit to the power input terminal, if the level of the output light intensity is below a preset intensity threshold. In this way, the status indicating light unit may detect a degrading of the LED(s), such as due to ageing thereof. Upon detecting such degrading of the LED(s), the status indicating light unit may switch to the pulsed power draw mode. This in turn signals to the power supply that the ageing of the LED(s) has progressed to a critical extent and that maintenance of the status indicating light unit should be performed. This maintenance could then entail a replacement of the whole status indicating light unit or of the illumination circuit only. In this way, the status indicating light unit is self-diagnostic, which eliminates or reduces the need for scheduled maintenance thereof.

According to a further embodiment, the pulsed power reception circuit comprises a chargeable element and an alternating switch, which is adapted to alternate between a closed state and an open state. The pulsed power reception circuit may be configured to effect power transfer from the power input terminal to the illumination circuit and to the chargeable element, when the alternating switch is in the closed state. The pulsed power reception circuit may further be configured to de-couple the illumination circuit and the chargeable element from the input terminal, when the alternating switch is in the open state. The chargeable element may be coupled to the illumination circuit in such a way that it provides power to the illumination circuit, when the alternating switch is in the open state. In other words, the status indicating light unit draws power from the external power supply, when the alternating switch is in the closed state, while no power is drawn by the status indicating light unit, when the alternating switch is in the open state. The resulting power draw pattern is the pulsed power draw pattern. The combination of the chargeable element and the alternating switch is a power-efficient means of generating the pulsed power draw pattern, i.e. of generating the desired signal about the operational status to the external power supply, while at the same time ensuring continuous illumination by the LED(s) of the illumination circuit. The operation of the status indicating light unit is unchanged, when seen from the outside. Only the internal signalling behaviour indicates to the power supply that the operational status has changed.

According to an alternative embodiment, the alternating switch does not alternate between a closed state and an open state, but allows different levels of power transfer between the power input terminal and the illumination circuit. The alternating switch may be able to generate a desired waveform of the pulsed power draw for signalling purposes, with the desired waveform not having off intervals.

According to a further embodiment, the alternating switch is adapted to alternate between the closed state and the open state in a periodic manner with a frequency of less than 10 Hz. In this way, an easily detectable pulsed power draw pattern with a low frequency may be achieved. The low frequency allows for an easy implementation of the alternating switch.

According to a further embodiment, the chargeable element is a capacitance. A capacitance is a low-cost passive chargeable element, which is suitable for temporarily storing electric energy. The capacitance may be a discrete capacitor, i.e. a dedicated circuit element, or a passive capacitance or any other suitable capacitive structure for storing electric energy.

According to a further embodiment, the pulsed power reception circuit further comprises a resistor coupled in parallel with the capacitance, the capacitance and the resistor conditioning the power absorption characteristics of the status indicating light unit in the pulsed power draw mode. In other words, the capacitance and the resistor together form a passive network that shapes the power reception characteristics of the pulsed power reception circuit, when the alternating switch is in a closed state. In this way, the power transfer from the external power supply to the status indicating light unit is conditioned in such a way that the pulsed power draw pattern may be easily and reliably detected by the external power supply. It is pointed out that it is also possible to provide an active power reception conditioning module.

According to a further embodiment, a peak value of received power in the pulsed power draw mode is above a preset power threshold. The exceeding of the preset power threshold signals to the external power supply that the pulsed power draw mode is present. In this way, the detection mechanism of the external power supply unit may be implemented in a very simply manner, namely by implementing a monitoring of a preset power threshold for the power transfer to the status indicating light unit. The preset power threshold is higher than a value of received power in the continuous power draw mode. In this way, the continuous power draw mode is not by mistake detected as an extraordinary operational situation. In particular, the preset power threshold may be a detecting tolerance interval above the value of received power in the continuous power draw mode. The term received power refers to the power received by the status indicating light unit.

According to a further embodiment, the peak value of received power in the pulsed power draw mode is at least 20% higher, in particular at least 50% higher, and further in particular at least 100% higher than the value of received power in the continuous power draw mode. In this way, there is a significant deviation between the peak value of received power in the pulsed power draw mode and the value of received power in the continuous power draw mode. In particular, the peak value of received power in the pulsed power draw mode significantly exceeds the value of received power in the continuous power draw mode. The peak value of received power in the pulsed power draw mode is out of a detecting tolerance interval, which may be provided around the nominal operation value in the continuous power draw mode.

According to a further embodiment, the preset power threshold is at least 20% higher, in particular at least 50% higher, and further in particular at least 100% higher than the value of received power in the continuous power draw mode. In this way, the detecting by the external power supply is particularly reliable, as the preset power threshold significantly deviates from the power draw in the continuous power draw mode.

By establishing such a significantly higher preset power threshold, the detection capabilities of the external power supply are extended to light units with low power consumption. For prior art light units with low power consumption, a change of the absorbed power could often not be detected, because the absolute change was small enough to be deemed negligible noise in an extended power supply system. In particular, for low power prior art light units that increase their current in order to account for ageing of the LED(s), the increase in current and thus in power consumption was not big enough to be perceived by the external power supply as a critical increase, which is a sign of a near end of life situation for the LED(s). In contrast thereto, setting the peak value of received power in the pulsed power draw mode to a significantly higher value than would be necessary for continuously operating the LED(s), a safe detection of a near end of life situation can be ensured, even in low power light units. It is pointed out that the pulsed power draw mode may be combined with an increase in current to the LED(s) in order to account for the ageing of the LED(s).

According to a further embodiment, the status indicating light unit has a power consumption of 50 W or less in the continuous power draw mode. In particular, the status indicating light unit may have a power consumption of 30 W or less, further in particular of 20 W or less, in the continuous power draw mode.

According to a further embodiment, a mean value of received power in the pulsed power draw mode substantially corresponds to a value of received power in the continuous power draw mode. In this way, the signalling is performed in a very energy-efficient manner, keeping the average power consumption of the status indicating light unit the same in both operating modes. Reliable signalling without an increase in power consumption is achieved. The term substantially corresponds refers to a situation where the mean value of received power in the pulsed power draw mode is within ±10%, in particular within ±5%, of the received power in the continuous power draw mode.

According to a further embodiment, the illumination circuit comprises a plurality of LEDs connected in series. In this way, the total light intensity of the status indicating light unit may be easily adapted to a particular desired light intensity. By placing a plurality of LEDs in series, the same current flows through the plurality of LEDs, leading to identical operating conditions for the LEDs. When using nominally identical LEDs, the total light intensity may be easily predicted and controlled. It is pointed out that it is also possible to have multiple series connections of LEDs and to connect those series connections in parallel. In other words, multiple LED strings connected in parallel are also possible.

According to a further embodiment, the status indicating light unit is an exterior aircraft light unit, such as a navigation light unit, a beacon light unit, a wing scan light unit, a runway turnoff light unit, a taxi light unit, an external emergency light unit, or a cargo light unit. Said examples of exterior aircraft light unit are light units of comparably low power demand, e.g. as compared to an anti-collision light unit. As discussed above, the signalling via the pulsed power draw mode is particularly beneficial for light units of comparably low power where operational status detection was particularly difficult in previous approaches.

Exemplary embodiments of the invention further include an arrangement of a power supply and a status indicating light unit, as described in accordance with any of the embodiments above, wherein the power supply is configured to detect the operational status of the status indicating light unit depending on the respective power draw patterns. In this way, the status indicating light unit acts as the sender of information about its operational status and the power supply acts as the receiver of information about the operational status of the status indicating light unit. The information is contained in a modulation of the power drawn by the status indicating light unit from the power supply. It is pointed out that the term power supply refers to the entity supplying power to the status indicating light unit, be it a power generating unit or a power controller, which itself may be coupled to a power generating unit or a power supply network. The power controller may be a solid state power controller. The power controller, or any other suitable power supply detecting the operational status, may send a notice about the operational status to a maintenance computer or a vehicle control computer, such as an aircraft board computer. From there, the information may be brought to the attention of the vehicle operating personnel or to the attention of the maintenance personnel.

Exemplary embodiments of the invention further include a passenger transport vehicle, such as an aircraft, road vehicle, ship or rail car, comprising at least one status indicating light unit, as described in accordance with any of the embodiments above. In particular, the at least one status indicating light unit may be positioned in the exterior of the passenger transport vehicle Exemplary embodiments of the invention further include a passenger transport. The modifications and advantages discussed above with respect to the status indicating light unit equally apply to the passenger transport vehicle.

Exemplary embodiments of the invention further include a method of replacing a used exterior light unit of an aircraft with a status indicating light unit, as described in accordance with any of the embodiments above, the method comprising the steps of disconnecting the used exterior light unit from a power supply network of the aircraft, and connecting the status indicating light unit, as described in accordance with any of the embodiments above, to the power supply network of the aircraft. Existing exterior light units may in this way be substituted with the status indicating light units discussed above. Without having to change the wiring, the advantages of the status indication may be made use of. In this way, the present invention may be extended to existing aircraft. The functionality of the existing power supply may not need any or only minor changes, depending on the previously implemented power draw monitoring and the previously implemented acceptable power draw values.

BRIEF DESCRIPTION OF THE DRAWINGS

Embodiments of the invention are described in greater detail below with reference to the figures, wherein.

DETAILED DESCRIPTION

Figure 1:
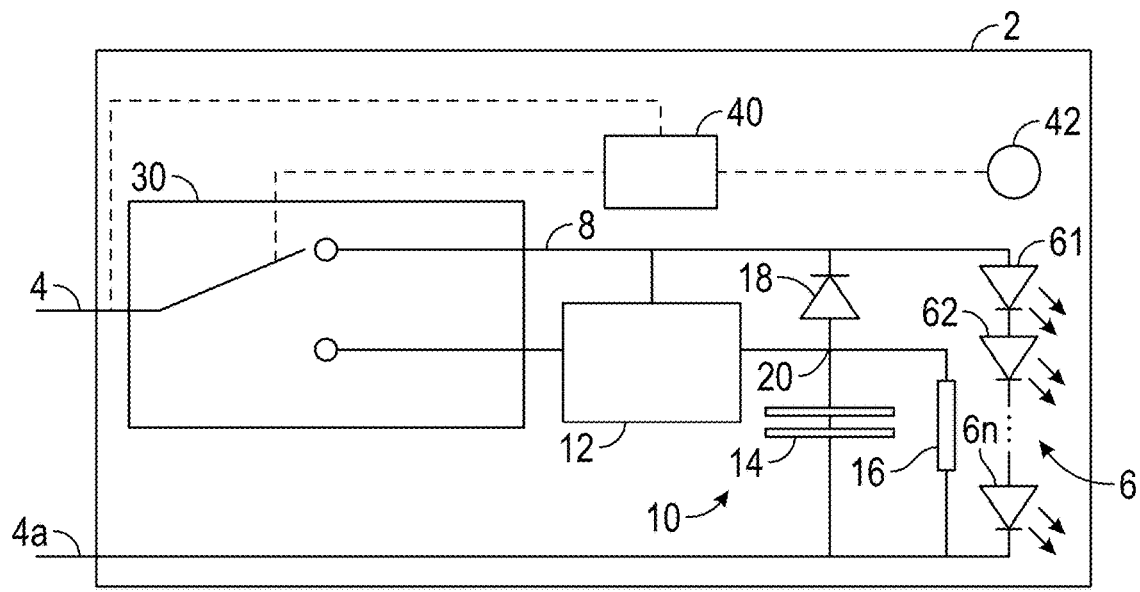
FIG. 1 shows a circuit diagram of an exemplary embodiment of a status indicating light unit in accordance with the invention.

FIG. 1 shows a circuit diagram of a status indicating light unit 2 in accordance with an exemplary embodiment of the invention. The circuit diagram of FIG. 1 shows circuit components only. Mechanical components, such as a mounting plate, e.g. a printed circuit board, a housing, and a lens cover are omitted for a clearer representation of the circuit structure.

The status indicating light unit 2 has two external terminals, namely a power input terminal 4 and a ground terminal 4a. The power input terminal 4 is coupleable to an external power supply, i.e. to a power supply that is outside of the status indicating light unit 2. The ground terminal 4a may also be connected to the external power supply, in particular to a ground terminal thereof. It may also be coupled to a commonly available ground rail, as is present throughout many passenger transport vehicles at various locations thereof.

The power input terminal 4 is coupled to a mode selection switch 30. The mode selection switch 30 has one input, to which the power input terminal 4 is coupled, and two outputs. The mode selection switch 30 is configured to selectively couple the power terminal input 4 to one of the two outputs. In other words, the mode selection switch is configured to couple the power input terminal 4 to one of the two outputs at any given point in time.

The first output of the mode selection switch 30 is coupled to a continuous connection circuit 8. The continuous connecting circuit 8 in turn is coupled to an illumination circuit 6. In the exemplary embodiment of FIG. 1, the continuous connection circuit 8 consists of a simple wire connection that couples the first output of the mode selection switch 30 to the illumination circuit 6.

The illumination circuit 6 consists of a plurality of LED's. Out of this plurality of LED's, a first LED 61, a second LED 62, and an n-th LED 6n are shown. The dashed connection between the second LED 62 and the n-th LED 6n indicates that more LED's may be present. The number of LED's may be chosen in accordance with the desired light intensity of the status indicating light unit 2. The plurality of LED's are connected in a single series connection. However, other arrangements, such as a combined series and parallel connection, are possible as well. The end of the illumination circuit 6, i.e. the n-th LED 6n in the exemplary embodiment of FIG. 1, is coupled to the ground terminal 4a.

The second output of the mode selection switch 30 is coupled to a pulsed power reception circuit 10. The pulsed power reception circuit 10 comprises an alternating switch 12, a capacitor 14, a resistor 16, and a diode 18. The alternating switch 12 is coupled to the second output of the mode selection switch 30, to the illumination circuit 6, and to a junction 20. The capacitor 14 is coupled between the junction 20 and the ground terminal 4a. Also, the resistor 16 is coupled between the junction 20 and the ground terminal 4a. The diode 18 is coupled between the junction 20 and the illumination circuit 6. As the continuous connection circuit 8 is a single wire in the exemplary embodiment of FIG. 1, the coupling of the alternating switch 12 and of the diode 18 to the illumination circuit 6 is electrically equivalent to coupling of the alternating switch 12 and of the diode 18 to the continuous connection circuit 8.

The alternating switch 12 has two states. In a closed state, the second output of the mode selection switch 30 is connected to both the junction 20 and the illumination circuit 6. In other words, the second output of the mode selection switch 30 is coupled to both the capacitor 14 and the illumination circuit 6. In an open state, the alternating switch 12 does not effect any electric connection. In particular, no electric connection between the second output of the mode selection switch 30, the illumination circuit 6, and the junction 20 is made by the alternating switch 12.

The status indicating light unit 2 further comprises a switch controller 40 and a output light intensity detector 42. The output light detector 42 is coupled to the switch controller 40. Further, the power input terminal 4 is coupled to the switch controller 40. In addition, the switch controller 40 is coupled to the mode selection switch 30 for controlling the same.

The operation of the status indicating light unit 2 is described as follows. The status indicating light unit 2 can switch between two operating modes. In particular, the status indicating light unit 2 can operate in a continuous power draw mode and in a pulsed power draw mode. In the continuous power draw mode, the power input terminal 4 is coupled to the continuous connection circuit 8 via the first output of the mode selection switch 30. In the pulsed power draw mode, the power input terminal 4 is coupled to the pulsed power reception circuit 10 via the second output of the mode selection switch 30.

The operation in the continuous power draw mode is as follows. Power is received by the status indicating light unit 2 via the power input terminal 4, from where the current flows through mode selection switch 30 to the continuous connection circuit 8. The current then flows through the illumination circuit 6, by way of which the plurality of LED's 61, 62, . . . 6n emit light.

The operation in the pulsed power draw mode is explained as follows. In the pulsed power draw mode, the alternating switch 12 is coupled to the power input terminal 4 via the mode selection switch 30. As explained above, the alternating switch 12 may be in a closed state or in an open state. During the operation in the pulsed power draw mode, the alternating switch 12 alternates between the closed state and the open state. In the closed state, power from the power input terminal 4 is processed as follows. On the one hand, current is flown via the mode selection switch 30 and via the alternating switch 12 to the plurality of LED's 61, 62, . . . 6n. Accordingly, with the alternating switch 12 being in the closed state, the power flow to the illumination circuit 6 is very similar to the continuous power draw mode. On the other hand, power from the power input terminal 4 is also provided to the junction 20. Said power provided to the junction 20 is partially used for charging the capacitor 14 and is partially discharged through resistor 16. When the alternating switch 12 is in the open state, both the capacitor 14 and the illumination circuit 6 are de-coupled from the power input terminal 4. Due to the charge on the capacitor 14, a current starts to flow through the diode 18 and through the plurality of LED's 61, 62, . . . 6n. In this way, despite a de-coupling from the external power supply, a continuous illumination of the LED's in the illumination circuit 6 is provided for.

The values of the capacitor 14 and the resistor 16 may be chosen in a suitable manner. In particular, they may be chosen in such a way that a charging of the capacitor 14 during the closed state of the alternating switch 12 results in a desired power draw from the external power supply. In addition/as an alternative, the values may be chosen in such a way that the capacitor 14 discharges in a desired manner via the illumination circuit 6 during the open state of the alternating switch 12.

The selection between the continuous power draw mode and the pulsed power draw mode is controlled by the switch controller 40, which controls the mode selection switch 30. The switch controller 40 bases the control of the mode selection switch 30 on one or more momentary parameters of the status indicating light unit 2 and/or on the historic operation of the status indicating light unit 2. In a first exemplary embodiment, the switch controller 40 bases its decision on the output light intensity of the status indicating light unit 2, as detected by the output light intensity detector 42. If the output light intensity falls below a preset intensity threshold value, the switch controller 40 switches the status indicating light unit 2 into the pulsed power draw mode. The rationale behind this control is that the switch controller 40 deduces from the output light intensity that the performance of the illumination circuit 6 has unacceptably degraded due to ageing. While the status indicating light unit keeps functioning, i.e. while the LEDs 61, 62, . . . 6n keep emitting light, the pulsed power draw indicates to the external power supply that maintenance of the status indicating light unit 2 is in order.

In a second exemplary embodiment, the switch controller 40 counts the "on"-time of the status indicating light unit 2. In other words, the switch controller 40 deduces from the presence of a voltage at power input terminal 4 that the status indicating light unit 2 is in operation. By counting the operating duration of the status indicating the light unit 2, the switch controller 40 is able to compare said total "on"-time to a preset duration threshold value. If said threshold value is exceeded, the switch controller 40 switches the status indicating light unit 2 into the pulsed power draw mode. The rationale behind this control is that, after a predefined number of hours of operation, maintenance is in order.

In a third exemplary embodiment, the switch controller 40 bases its decision both on the output light intensity, as detected by the output light intensity detector 42, and the presence of a voltage at the power input terminal 4. If a non-significant voltage is present at the power input terminal 4, but no light intensity is emitted by the plurality of LED's 61, 62, . . . 6n, the switch controller 40 switches the status indicating light unit 2 into the pulsed power draw mode. The rationale behind this control is that the described situation indicates a non-functioning of the status indicating light unit 2 despite the provision of power by the external power supply. In other words, an operational error of the status indicating light unit 2 is present.

It is also possible that the switch controller 40 is coupled to further sensors and/or monitoring circuitry in order to monitor the proper functioning of the status indicating light unit. For example, the switch controller 40 may be coupled to the capacitor 14. In particular, the switch controller may be adapted to sense the charge state of the capacitor 14 and deduce a malfunction from the charging state and the control of the mode selection switch 30.

It is pointed out that it is possible that the status indicating light unit may further comprise a power conditioning module coupled to the output light intensity detector 42. This power conditioning module may increase the current through the plurality of LEDs 61, 62, . . . 6n, when their light intensity decreases. In this way, the desired total light intensity of the status indicating light unit 2 may be maintained despite ageing of the LEDs 61, 62, . . . 6n. The switching between the continuous power draw mode and the pulsed power draw mode does not exclude the provision of such current increasing due to ageing of the LEDs.

In FIG. 2, the status indicating light unit 2 of FIG. 1 is shown in the context of a power supply and control system of an aircraft. In particular, the status indicating light unit 2 is coupled to a power supply 50 via a power line. The power supply 50 is the power supply as seen from the status indicating light unit 2. In particular, the power supply 50 may be a mere power controller that is in turn coupled to a power supply network of the aircraft. However, the power supply 50 may also be an integrated power generation unit and power controller. In either case, the power controller may be a solid state power controller. The power supply 50 may be a power supply dedicated to the status indicating light unit 2. In other words, the status indicating light unit 2 may be the only light unit supplied with power by the power supply 50. However, it is also possible that the power supply 50 supplies power to a plurality of light units across the aircraft, in particular to a plurality of status indicating light units.

The power supply 50 is further coupled to an aircraft maintenance computer 60 via a data link, shown as a dashed line.

In FIG. 2, three different power draw patterns are shown over the power line between the power supply 50 and the status indicating light unit 2. These power draw patterns are exemplary in nature. They illustrate possible power draw patterns. However, other power draw patterns are possible as well. All of the shown power draw patterns show the course of power reception by the status indicating light unit 2 over time.

Figure 2A:
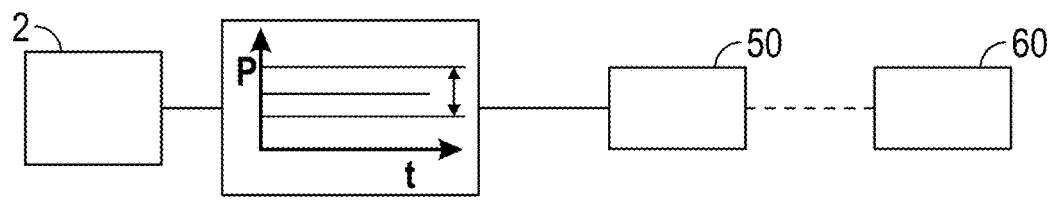
FIG. 2A-2C show three exemplary power transfer patterns between an exemplary power supply and the exemplary embodiment of the status indicating light unit of FIG. 1 over time.

In FIG. 2A, an exemplary continuous power draw pattern is illustrated. The power draw by the status indicating light unit 2 does not change over time. The drawn power is right in the middle between two threshold values, which indicate a detection tolerance interval. The power supply 50 deduces normal operation of the status indicating light unit 2, because it does not detect any power draw outside of said detecting tolerance interval. With the operation being as expected, the power supply 50 does not send any message to the aircraft maintenance computer 60.

Figure 2B:
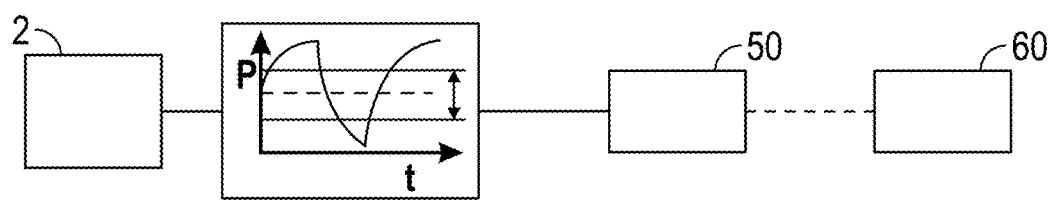
Figure 2C:
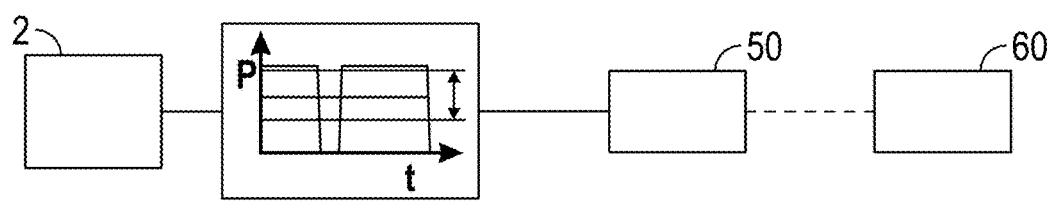

FIGS. 2B and 2C are two exemplary embodiments of possible pulsed power draw patterns. For comparison purposes, the level of continuous power draw is shown as a dashed line. In FIG. 2B, the power draw has exponential rising and falling edges, which alternate. During the rising edge of this pattern, the received power is used for providing current to the illumination circuit and for charging the chargeable element. As the charge on the capacitor increases, the received power increases over time during the rising edge. During the falling edge of the pulsed power draw pattern, the illumination circuit is powered by the capacitor. The remainder of the status indicating light unit 2 further draws power for its ancillary functions, such as the control of the mode selection switch 30, with the power draw sharply declining over the falling edge. The resulting power draw pattern leaves the detecting tolerance interval both towards the top and towards the bottom. In this way, the power supply 50 may easily and safely detect the pulsed power draw mode and deduce that the operational status of the status indicating light unit 2 is not normal. In this case, the power supply 50 sends a message to the aircraft maintenance computer 60 indicating that maintenance and/or replacement of the status indicating light unit 2 is in order. For example, such message may indicate that the status indicating light unit 2 is near the end of its operating life time.

FIG. 2C shows another exemplary embodiment of a pulsed power draw pattern. This pattern alternates between a constant power draw, exceeding the detecting tolerance interval, and intervals of no power draw at all. The intervals of no power draw at all correspond to the open state of the alternating switch 12 discussed above with respect to FIG. 1. In this embodiment, the constant power draw may be regulated with appropriate circuitry. Further, the power needed for the ancillary functions of the status indicating light unit may be taken from the capacitor 14, when the alternating switch 12 is open. Again, the power supply 50 is able to reliably detect the leaving of the detecting tolerance interval by the power draw pattern.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Status indicating light unit, comprising:
   a power input terminal, coupleable to an external power supply,
   an illumination circuit, comprising at least one LED,
   a continuous connection circuit, coupled to the illumination circuit and configured to effect a continuous power transfer from the power input terminal to the illumination circuit, with a continuous DC current being provided to the illumination circuit by the continuous connection circuit and with a continuous illumination being provided by the illumination circuit,
   a pulsed power reception circuit, coupled to the illumination circuit and configured to draw power from the power input terminal in a pulsed manner and to continuously emit power to the illumination circuit, with a continuous DC current being provided to the illumination circuit by the pulsed power reception circuit and with a continuous illumination being provided by the illumination circuit,
   wherein the pulsed power reception circuit comprises:
     a chargeable element, and
     an alternating switch, which is adapted to alternate between a closed state and an open state,
   wherein the pulsed power reception circuit is configured to effect power transfer from the power input terminal to the illumination circuit and to the chargeable element, when the alternating switch is in the closed state, and wherein the pulsed power reception circuit is configured to de-couple the illumination circuit and the chargeable element from the input terminal, when the alternating switch is in the open state,
   wherein the chargeable element is coupled to the illumination circuit in such a way that it provides power to the illumination circuit, when the alternating switch is in the open state, and
   wherein the continuous connection circuit and the pulsed power reception circuit provide separate current paths from the power input terminal to the illumination circuit, and
   a mode selection switch adapted to couple the continuous connection circuit to the power input terminal in a continuous power draw mode, resulting in a continuous power draw pattern of the status indicating light unit, and adapted to couple the pulsed power reception circuit to the power input terminal in a pulsed power draw mode, resulting in a pulsed power draw pattern of the status indicating light unit, with the respective power draw patterns of the status indicating light unit indicating an operational status of the status indicating light to the external power supply, and wherein the status indicating light unit is an exterior aircraft light unit.

2. Status indicating light unit according to claim 1, wherein the operational status comprises information about at least one of a level of an output light intensity of the illumination circuit, an operating duration of the status indicating light unit, and an operational error of the status indicating light unit.

3. Status indicating light unit according to claim 1, further comprising an output light intensity detector, adapted to detect a level of an output light intensity of the illumination circuit and to control the mode selection switch to couple the pulsed power reception circuit to the power input terminal, if the level of the output light intensity is below a preset intensity threshold.

4. Status indicating light unit according to claim 1, wherein the alternating switch is adapted to alternate between the closed state and the open state in a periodic manner with a frequency of less than 10 Hz.

5. Status indicating light unit according to claim 1, wherein the chargeable element is a capacitance.

6. Status indicating light unit according to claim 5, wherein the pulsed power reception circuit further comprises a resistor coupled in parallel with the capacitance, the capacitance and the resistor conditioning the power absorption characteristics of the status indicating light unit in the pulsed power draw mode.

7. Status indicating light unit according to claim 1, wherein a peak value of received power in the pulsed power draw mode is above a preset power threshold.

8. Status indicating light unit according to claim 7, wherein the preset power threshold is at least 20% higher than the value of received power in the continuous power draw mode.

9. Status indicating light unit according to claim 1, wherein a mean value of received power in the pulsed power draw mode substantially corresponds to a value of received power in the continuous power draw mode.

10. Status indicating light unit according to claim 1, wherein the illumination circuit comprises a plurality of LEDs connected in series.

11. Status indicating light unit according to claim 1, wherein the status indicating light unit is a navigation light unit, a beacon light unit, a wing scan light unit, a runway turnoff light unit, a taxi light unit, an external emergency light unit, or a cargo light unit.

12. An arrangement comprising
a power supply; and
a status indicating light unit in accordance with claim 1,
  wherein the power supply is configured to detect the operational status of the status indicating light unit depending on the respective power draw patterns.

13. An aircraft comprising:
at least one status indicating light unit according to claim 1.

14. Status indicating light unit according to claim 1, wherein the operational status comprises information about at least one of a level of an output light intensity of the illumination circuit, an operating duration of the status indicating light unit, and an operational error of the pulsed power reception circuit.

* * * * *